Patented Oct. 27, 1942

2,299,743

UNITED STATES PATENT OFFICE 2,299,743

COMPOSITION OF MATTER

Albert K. Epstein, Chicago, Ill.

No Drawing. Application May 12, 1941,
Serial No. 393,022

15 Claims. (Cl. 99—15)

My invention relates to the treatment of vegetable phosphatides in the form of solutions or compositions containing an oleaginous material such as a vegetable oil or a fat and is particularly concerned with improving the physical characteristics and utility thereof in the food industries and industrial arts.

Vegetable phosphatides, particularly soya bean phosphatides, as commercially produced, consist of lecithin and other phosphatides admixed with an oleaginous material such as soya bean oil. The phosphatides constitute, in the usual case, from about 50% to about 70% of the phosphatide composition. Such products, which may be denoted as crude phosphatides, are objectionable for a plurality of reasons including the difficulty of handling the same due to their viscous, sticky character, their poor color, and the difficulty of effectively distributing the same through the materials with which they are incorporated in the industrial field and more particularly in the food fields.

In accordance with my invention, the objections referred to hereinabove and others are overcome in a novel and effective manner. I have found that if the phosphatide preparation, containing oleaginous material such as a vegetable triglyceride oil or fat, such as has been described hereinabove, is treated with an oil-soluble aliphatic or fatty peroxide or oil-soluble aliphatic or fatty per-acid, particularly in the presence of a higher molecular weight aliphatic or fatty acid monoglyceride or the like, important advantages accrue, as pointed out hereinabove and as will be referred to hereinafter.

In order that those skilled in the art may readily understand the manner in which my invention may be carried out I list hereinbelow representative or illustrative examples. It will be understood that they are in no wise limitative of the full scope of my invention but that various changes may be made, as will become apparent, without departing from the principles or spirit of my invention. All parts mentioned are by weight.

Example A 30 parts of commercial soya bean lecithin, containing about 50% phosphatides and the balance largely soya bean oil, were mixed with 20 parts of commercial monostearin (containing predominantly monostearin and a lesser proportion of distearin) and 1.5 parts of lauroyl peroxide and the mixture was occasionally stirred while maintained at approximately 100 degrees C. for about 2 hours.

Example B 30 parts of commercial soya bean lecithin, of the character used in Example A, were mixed with 20 parts of substantially pure monolaurin and 1.5 parts of lauroyl peroxide and the mixture was occasionally stirred while maintained at approximately 100 degrees C. for about 2 hours.

Example C 0.9 part of lauroyl peroxide were dissolved in 4.5 parts of melted commercial monostearin and the resulting composition was admixed with 30 parts of commercial soya bean lecithin, and the mixture was heated, while occasionally stirring, for about 3 hours at 100 degrees C.

Example D 50 parts of commercial soya bean lecithin, of the character used in Example A, were admixed with 2.0 parts of lauroyl peroxide and the mixture was heated at 70 degrees C. for 3 hours with occasional stirring.

The practice of my invention results in the production of compositions which have improved physical consistency, color and ability to be distributed, in the small proportions in which they are usually employed, in the compositions in which lecithin is conventionally used in the arts. Where monoglycerides and the like are employed, the color appears to be still further improved. Furthermore, where normally solid monoglycerides and the like are utilized, particularly monostearin, for example, commercial monostearin, the final composition has a consistency such that it may readily be cut with a knife. Many of the compositions, for example, that of Example A, have a consistency and physical character resembling beeswax and may be used, in many cases, in place of beeswax in cosmetic formulae and for other purposes with particular advantage.

In place of lauroyl peroxide, which is utilized in the examples set out hereinabove, I may employ other oil-soluble aliphatic or fatty peroxides or oil-soluble aliphatic or fatty per-acids such as, for example, acetone peroxide, propionyl peroxide, butyryl peroxide, and the peroxides and per-acids of fatty acids such as caproic acid, caprylic acid, capric acid, lauric acid, myristic acid, palmitic acid, stearic acid, oleic acid, melissic acid, ricinoleic acid, linoleic acid, palmitoleic acid, as well as the peroxides or per-acids of mixtures of any two or more of the said acids, particularly, of the mixed higher molecular weight fatty acids derived from animal and vegetable sources as, for example, coconut oil, sesame oil, lard, palm oil, palm kernel oil, olive oil, corn oil, cottonseed oil, sardine oil, tallow, soya bean oil, peanut oil, castor oil, seal oils, whale oil, and other fish oils, and hydrogenated animal and vegetable oils such as those mentioned. In general, the peroxides of the fatty acids containing from 8 to 18 carbon atoms are particularly useful and lauroyl peroxide or peroxides of mixtures of fatty acids in which lauroyl peroxide predominates are especially satisfactory.

In place of monostearin and monolaurin, specifically mentioned in the hereinabove examples, I may use other higher molecular weight aliphatic or fatty acid partial esters of aliphatic polyhydroxy substances. Specific examples of such substances are, for example, monocaprylin, dicapyrylin, dilaurin, mono-olein, di-olein, mono-palmitin, dipalmitin, monomyristin, dimyristin, distearin, stearic acid mono-ester of diglycerol, stearic acid mono-ester of triglycerol; lauric acid mono- and di-esters of sorbitol, mannitol, and dulcitol; lauric acid mono-ester of ethylene glycol; stearic acid mono-ester of di-ethylene glycol, triethylene glycol, and tetraethylene glycol; and the like.

In general, the aliphatic polyhydroxy substances whose higher molecular weight aliphatic or fatty acid partial esters may be used in accordance with the present invention include, among those mentioned, glycerol, glycols such as ethylene glycol, propylene glycol, trimethylene glycol, butylene glycol and the like; polyglycols such as diethylene glycol, triethylene glycol, tetraethylene glycol, pentaethylene glycol, and hexaethylene glycol; pentaerythritol; quercitol; triethanolamine; tripropanolamine; polyglycerols such as diglycerol, triglycerol, and tetraglycerol and the like including mixtures thereof; carbohydrates and sugars including mono-, di-, and polysaccharides, such as dextrose, sucrose, xylose, arabinose, galactose, fructose, maltose, mannose, dextrin, starch, and the like; sugar alcohols such as arabitol, mannitol, mannitan, sorbitol, sorbitan, and dulcitol, and the like.

The higher molecular weight aliphatic or fatty acids whose partial esters with the aliphatic polyhydroxy substances may be used in accordance with and for the purposes of the present invention include, among those mentioned, caprylic acid, pelargonic acid, capric acid, lauric acid, myristic acid, palmitic acid, stearic acid, lauric acid, ricinoleic acid, and mixtures of any two or more of the said and other higher fatty acids such as are derived from animal or vegetable sources as, for example, lard, coconut oil, rapeseed oil, sesame oil, palm kernel oil, palm oil, olive oil, corn oil, cottonseed oil, tallow, soya been oil, peanut oil, castor oil, fish oils, and partially or completely hydrogenated animal and vegetable oils of the character mentioned hereinabove.

I have found that the normally solid higher molecular weight fatty acid monoglycerides or mixtures of mono- and di-glycerides containing predominantly monoglycerides are particularly satisfactory and of especial utility are monostearin and monolaurin, either commercial or substantially pure.

The proportions of the oil-soluble aliphatic or fatty peroxides or per-acids and the proportions of the mono-glycerides or the like, where used, are subject to relatively wide variations. In general, the amount of peroxide need not exceed approximately 10%, based on the weight of the phosphatide-oil composition, and should ordinarily be less than 1%, from 2% to 4% being, in general, sufficient, at least in most cases. The amount of monoglyceride or the like may vary widely as, for example, from about 10% by weight of the phosphatide-oil composition to amounts in excess of said phosphatide-oil composition. A satisfactory range is of the order of 15% to 40% of the monoglyceride or the like, based on the weight of the phosphatide-oil composition.

The mixture of the various ingredients, as set out hereinabove more particularly in the examples, may be permitted to react at room temperatures or preferably within the general range of 40 degrees C. to somewhat higher than 100 degrees C., it being understood that the length of time of the reaction should be increased correspondingly with the use of the lower temperatures. In general, I prefer to employ temperatures from about 80 degrees C. to 100 degrees C. In the usual case, from one to four hours of treatment at the more elevated range of temperatures will suffice although good results are frequently obtained even where the reaction period is substantially less than one hour.

The term "higher," wherever used herein in connection with fatty acids, will be understood to mean at least 8 carbon atoms unless otherwise specifically stated.

What I claim as new and desire to protect by Letters Patent of the United States is:

1. A method of treating vegetable phosphatides, dissolved in an oleaginous material, to improve the characteristics of said phosphatides, which comprises subjecting the same to the action of a member selected from the group consisting of oil-soluble aliphatic peroxides and oil-soluble aliphatic per-acids.

2. A method of treating crude soya bean phosphatides, dissolved in an oleaginous material, to improve the characteristics of said phosphatides, which comprises subjecting the same to the action of a fatty peroxide containing from 8 to 18 carbon atoms.

3. A method of treating crude soya bean phosphatides, dissolved in an oleaginous material, to improve the characteristics of said phosphatides, which comprises subjecting the same to the action of lauroyl peroxide.

4. A method of treating vegetable phosphatides, dissolved in an oleaginous material, to improve the characteristics of said phosphatides, which comprises admixing the same with a higher molecular weight aliphatic acid partial ester of an aliphatic polyhydroxy substance and with a member selected from the group consisting of oil-soluble aliphatic peroxides and oil-soluble aliphatic per-acids.

5. A method of treating crude soya bean phosphatides, dissolved in an oleaginous material, to improve the characteristics of said phosphatides, which comprises admixing the same with a higher molecular weight fatty acid partial ester of an aliphatic polyhydroxy substance and with an oil-soluble fatty peroxide containing from 8 to 18 carbon atoms, and heating the mixture at a slightly elevated temperature.

6. A method of treating soya bean phosphatides, dissolved in an oleaginous material, to improve the characteristics of said phosphatides, which comprises admixing the same with a higher molecular weight fatty acid monoglyceride and with an oil-soluble fatty peroxide having from 8 to 18 carbon atoms.

7. A method of treating soya bean phosphatides, dissolved in an oleaginous material, to improve the characteristics of said phosphatides, which comprises admixing the same with monostearin and with lauroyl peroxide and reacting the mixture at a slightly elevated emperature.

8. A composition of matter comprising predominantly vegetable phosphatides, oleaginous material, and the residue resulting from the interaction of said vegetable phosphatides with a member selected from the group consisting of oil-soluble aliphatic peroxides and oil-soluble aliphatic per-acids.

9. A composition of matter comprising predominantly soya bean phosphatides, oleaginous material, and the residue resulting from the interaction of said soya bean phosphatides with an oil-soluble fatty peroxide containing from 8 to 18 carbon atoms.

10. An edible composition of matter comprising predominantly soya bean phosphatides, triglyceride oil or fat, and the residue resulting from the interaction of said soya bean phosphatides with lauroyl peroxide.

11. A composition of matter comprising predominantly soya bean phosphatides, vegetable oil or fat, a higher molecular weight aliphatic acid partial ester of an aliphatic polyhydroxy substance, and the residue resulting from the interaction of said soya bean phosphatides with a member selected from the group consisting of oil-soluble aliphatic peroxides and oil-soluble aliphatic per-acids.

12. A composition of matter comprising predominantly vegetable phosphatides, vegetable oil or fat, a member selected from the group consisting of higher molecular weight fatty acid monoglycerides and diglycerides, and the residue resulting from the interaction of said vegetable phosphatides with a fatty peroxide containing from 8 to 18 carbon atoms.

13. A composition of matter comprising predominantly soya bean phosphatides, vegetable oil or fat, monostearin, and the residue resulting from the interaction of said soya bean phosphatides with lauroyl peroxide.

14. A composition of matter containing vegetable phosphatides, oleaginous material, and the residue resulting from the interaction of said vegetable phosphatides with a member selected from the group consisting of oil-soluble aliphatic peroxides and oil-soluble aliphatic per-acids, the vegetable phosphatides comprising not substantially less than 30% by weight of said composition.

15. A composition of matter containing soya bean phosphatides, vegetable oil or fat, a higher molecular weight aliphatic acid partial ester of an aliphatic polyhydroxy substance, and the residue resulting from the interaction of said soya bean phosphatides with a member selected from the group consisting of oil-soluble aliphatic peroxides and oil-soluble aliphatic per-acids, the soya bean phosphatide comprising not substantially less than 30% by weight of said composition.

ALBERT K. EPSTEIN.